United States Patent [19]

Seol

[11] Patent Number: 5,701,215

[45] Date of Patent: Dec. 23, 1997

[54] TAPE CASSETTE LOADING APPARATUS OF TAPE RECORDER INCLUDING A SPRING MEMBER FOR BIASING A CASSETTE TOWARDS REEL TABLES

[75] Inventor: Young-yun Seol, Suwon, Rep. of Korea

[73] Assignee: Samsung Electronics Co., Ltd., Kyungki-do, Rep. of Korea

[21] Appl. No.: 647,833

[22] Filed: May 15, 1996

[30] Foreign Application Priority Data

Nov. 23, 1995 [KR] Rep. of Korea ............ 95-35158

[51] Int. Cl.⁶ .................................................. G11B 15/675
[52] U.S. Cl. ................................................................ 360/96.5
[58] Field of Search ........................ 360/93, 96.1, 96.5, 360/96.6, 132, 133; 242/335, 338

[56] References Cited

U.S. PATENT DOCUMENTS

| 5,014,151 | 5/1991 | Uehara et al. | 360/133 |
| 5,162,956 | 11/1992 | Emori et al. | 360/96.6 |
| 5,196,972 | 3/1993 | Matsumaru et al. | 360/96.5 |
| 5,323,281 | 6/1994 | Park | 360/96.5 |
| 5,405,097 | 4/1995 | Nakanishi | 242/338.4 |
| 5,548,460 | 8/1996 | Ohira et al. | 360/132 |

*Primary Examiner*—Jefferson Evans
*Attorney, Agent, or Firm*—Sughrue, Mion, Zinn, Macpeak & Seas, PLLC

[57] ABSTRACT

A tape cassette loading apparatus of a tape recorder operates with reduced noise and fewer components. A biasing unit for elastically biasing a tape cassette during placement onto reel tables toward the reel tables is provided with a leaf spring member having one end fixed at the side of a holder and a stop installed on the holder at any location on an elastic deformation path of the leaf spring member. Thus, a single leaf spring member enables a tape cassette to be stably placed on the holder and seated on the reel tables.

8 Claims, 8 Drawing Sheets

TAPE CASSETTE LOADING APPARATUS OF TAPE RECORDER INCLUDING A SPRING MEMBER FOR BIASING A CASSETTE TOWARDS REEL TABLES

BACKGROUND OF THE INVENTION

The present invention relates to a tape cassette loading apparatus of a tape recorder and, more particularly, to a tape cassette loading apparatus of a tape recorder in which a tape cassette can be stably placed in a holder during an initial loading and onto reel tables after loading, by means of a single spring member.

In general, tape recording devices such as video tape recorders (VTRs) or camcorders are provided with a holder for receiving a tape cassette. The holder is moved by a predetermined loading apparatus and enables the movement of a tape cassette from a receiving position onto the reel tables in a loaded position.

FIGS. 1 and 2 show the main parts of a loading mechanism of a VTR. In FIG. 1, there is a deck member 100 on which a head drum 10, reel tables (not shown) and a tape guide (not shown) are installed. Guide brackets 120 and 130 are respectively installed at opposite sides of the deck member 100 and have guide slots 121 and 122 and guide slots 131 and 132 (FIG. 2), respectively, which include horizontal and vertical portions. Guide pins 111 and 112 and guide pins 113 and 114, which are slidingly connected to the guide slots 121 and 122 and guide slots 131 and 132, respectively, are situated at opposite sides of a holder 110 which is operative to receive a tape cassette. One side of the holder 110 is supported by a leaf spring 150' for applying pressure to the top of the tape cassette. A pair of loading arms 140 and 150, for moving the holder 110 along the guide slots 121 and 122 and the guide slots 131 and 132, are installed between the guide brackets 120 and 130. The loading arms 140 and 150 are fixed at the ends of a shaft 160 rotatably mounted in the guide brackets 120 and 130.

The loading arms 140 and 150 have the guide holes 142 and 152 where the guide pins 112 and 114 of the holder 110 slidingly connect and torsion springs 143 and 153 elastically contact the guide pins 112 and 114. As shown in FIGS. 2 and 3, the loading arm 140 has a gear portion 144. A movement member 170 is provided on the deck member 100, which can be moved by a loading motor (not shown) and has a rack gear portion 172 which engages with the gear portion 144. Reference numeral 175 denotes a rack gear portion formed on the side of the movement member 170 for connection to the loading motor.

During operation of the loading apparatus, a tape cassette is stably inserted into the holder 110 by pressure applied to the tape cassette by the leaf spring 150'. Subsequently, the loading motor drives the movement member 170 and accordingly the loading arms 140 and 150 are rotated by the gear portion 172 of the movement member 170. Thus, the holder 110 is moved along the guide slots 121 and 122 and guide slots 131 and 132 by the rotation of the loading arms 140 and 150. Referring to FIG. 3, the holder 110 is elastically biased downwardly by the torsion spring 143 during the final step of loading in which the tape cassette is seated on the reel tables.

However, the loading apparatus as described above, in addition to the leaf spring 150' for stably retaining the received tape cassette in the holder 110, also needs to have the torsion springs 143 and 153 for retaining the tape cassette stably in place on the reel tables. This makes the apparatus complicated, thereby requiring more time for assembly. Also, noise is created by the restoring force of the torsion springs 143 and 153 during ejection of the tape cassette.

SUMMARY OF THE INVENTION

Accordingly, it is an object of the present invention to provide a tape cassette loading apparatus of a tape recorder having a simple structure wherein the tape cassette remains stable during placement onto the reel tables and noise is significantly reduced.

To accomplish the above object, there is provided a tape cassette loading apparatus of a tape recorder, comprising: a deck member having reel tables on which a tape cassette is seated; a holder movably mounted with respect to the deck member for receiving the tape cassette; means for guiding the holder from the initial position of the tape cassette to a seated position; a movement unit for moving the holder; and means for elastically biasing the tape cassette toward the reel tables when the tape cassette is at the seated position, wherein the biasing means has a leaf spring member with one end fixed at one side of said holder, and a stop installed on the holder at a predetermined position on an elastic deformation path of the leaf spring member so that when the tape cassette is seated on the reel tables, a part of the leaf spring member presses the upper surface of the tape cassette while the other end of the leaf spring is supported by the stop.

According to the present invention, when the tape cassette is inserted into the holder, the pressure is applied to the top of the cassette by the leaf spring portion so that the tape cassette can be stably inserted into the holder and thereby permit stable placement onto the reel tables by being pressed with the leaf spring which has a stronger elasticity. A single leaf spring enables the tape cassette to be stabilized during initial insertion and to be stably placed onto the reel tables. Accordingly, noise generated during ejecting can be reduced, and the number of components is reduced, so that assembly can be simplified.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENTS

Figure 1:
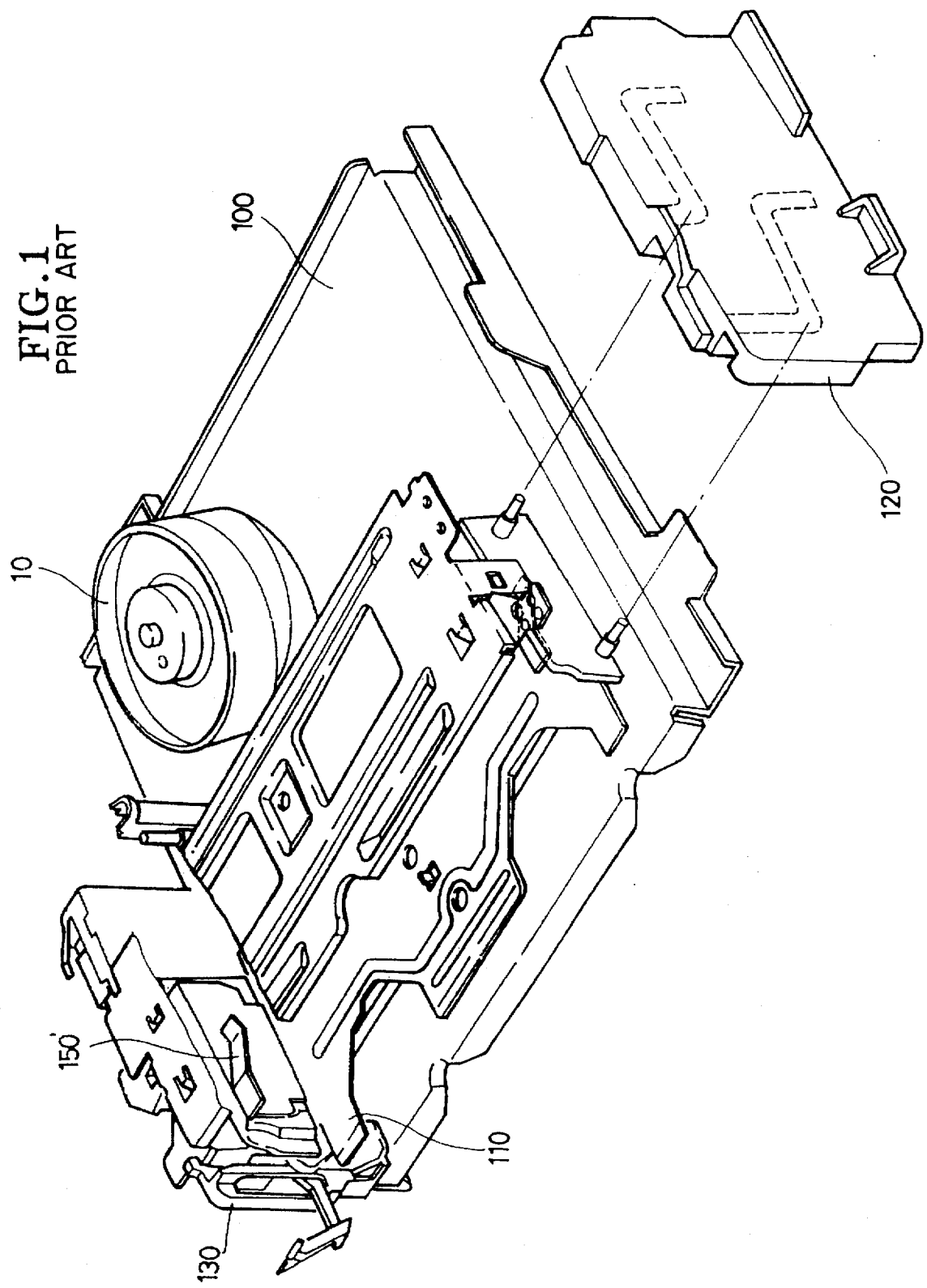
FIG. 1 is a perspective view of a VTR adopting a previously proposed loading apparatus.
Figure 2:
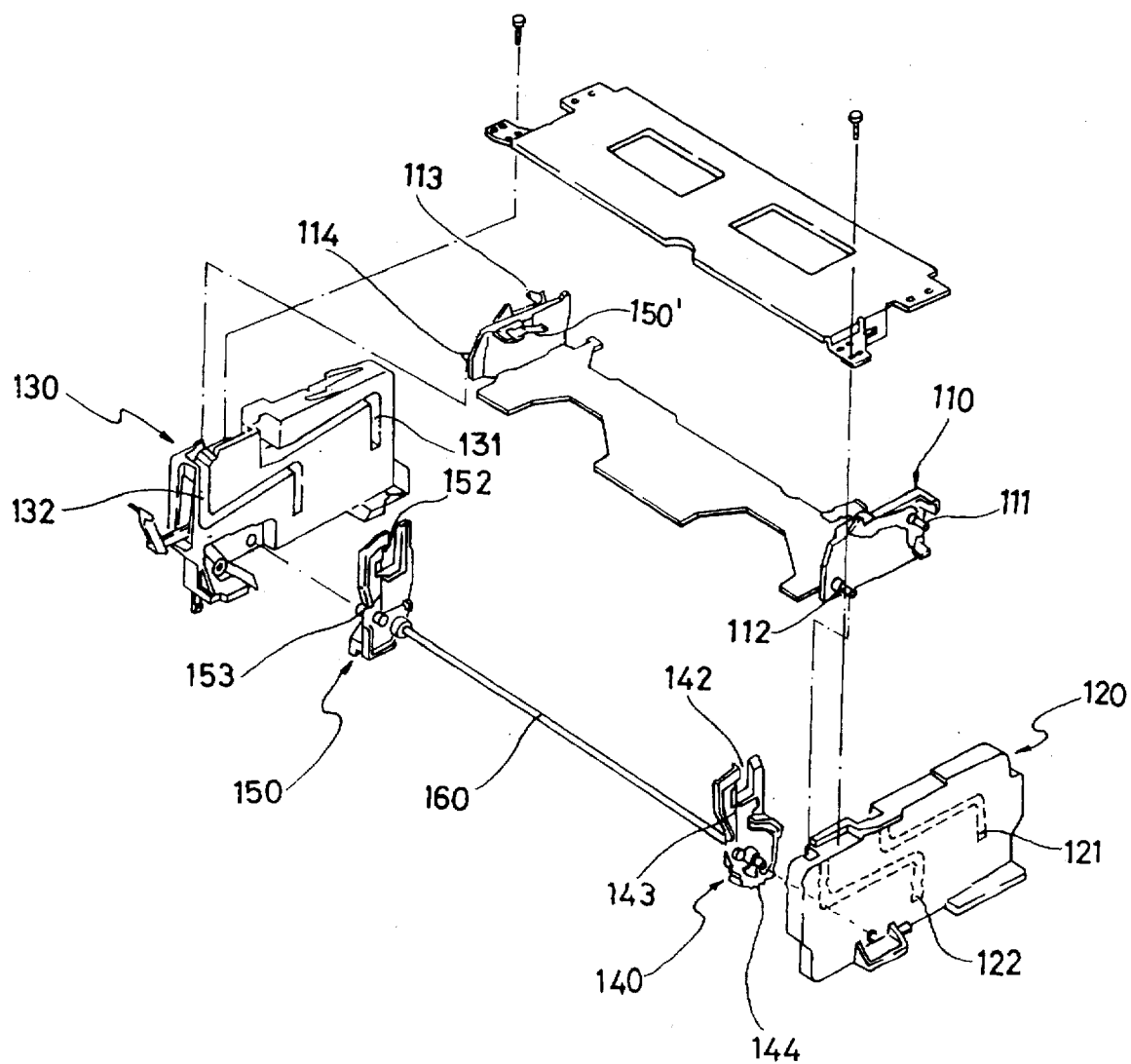
FIG. 2 is a perspective view of the main parts extracted from the loading apparatus shown in FIG. 1.
Figure 3:
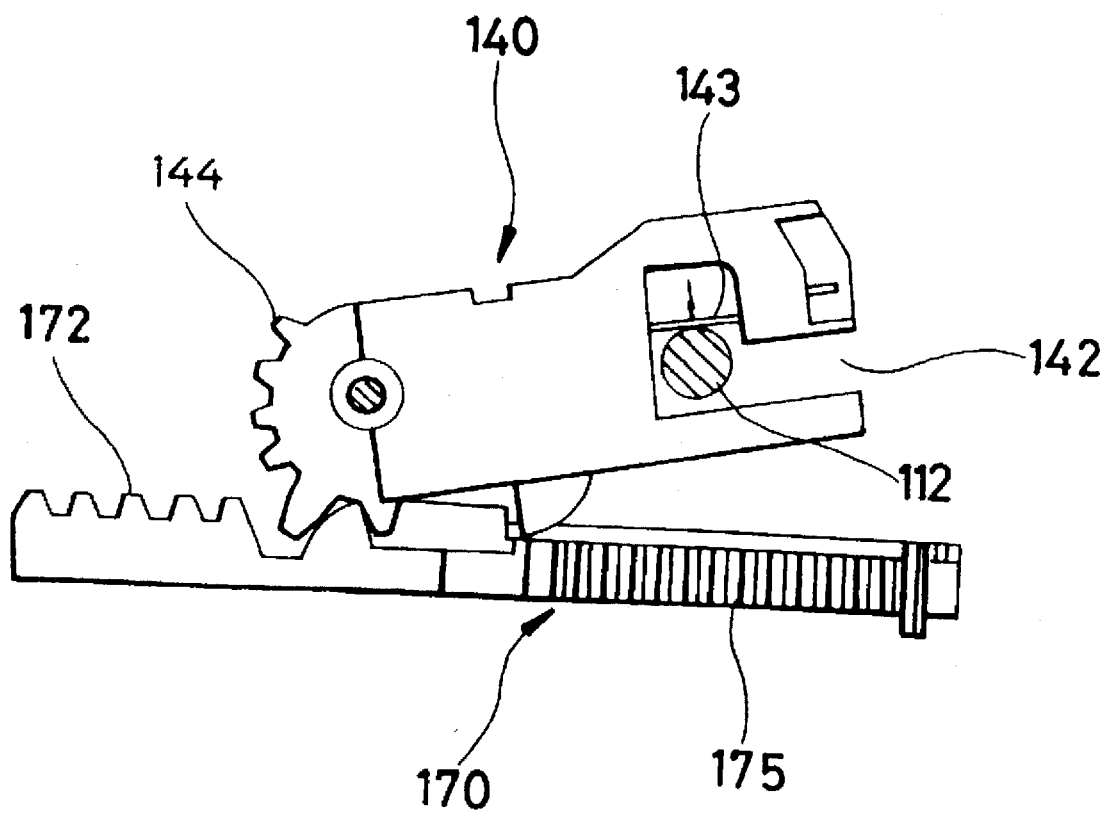
FIG. 3 is a view showing the gearing during operation of the previously proposed loading apparatus.
Figure 4:
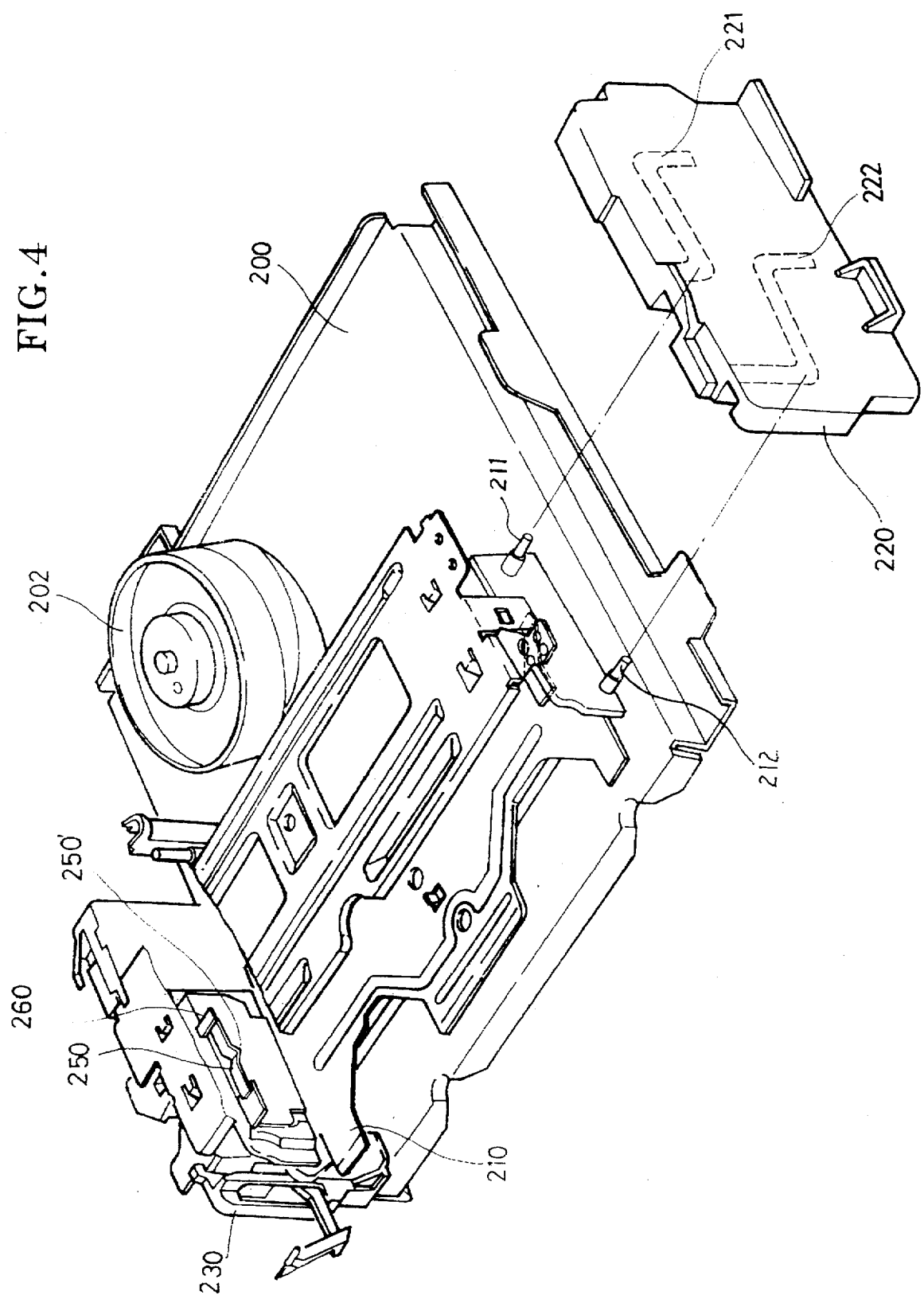
FIG. 4 is a perspective view of a VTR adopting a loading apparatus according to the present invention.

Referring to FIG. 4, reference numeral 200 denotes a deck member having a head drum 202, reel tables (not shown) and a tape guide (not shown). Reference numeral 210 denotes a holder on which a tape cassette 300 (FIG. 5) is received. The holder 210 can be guided by a predetermined guiding unit to the reel tables from where the tape cassette 300 is initially inserted and is moved by a predetermined moving unit.

The structure of the guiding unit includes guide brackets 220 and 230 installed at both sides of the deck member 200, each having guide slots 221 and 222, and each of the guide slots having horizontal and vertical portions. Guide pins 211 and 212 provided on one side of the holder 210 slidingly connect to the guide slots 221 and 222, respectively, of the guide bracket 220. There are corresponding guide pins (not shown) on the other side of the holder 210 for corresponding guide slots (not shown) of the guide bracket 230. Accordingly, the holder 210 can be horizontally or vertically moved along the guide slots 221 and 222 formed on the guide brackets 220 and 230.

Figure 5:
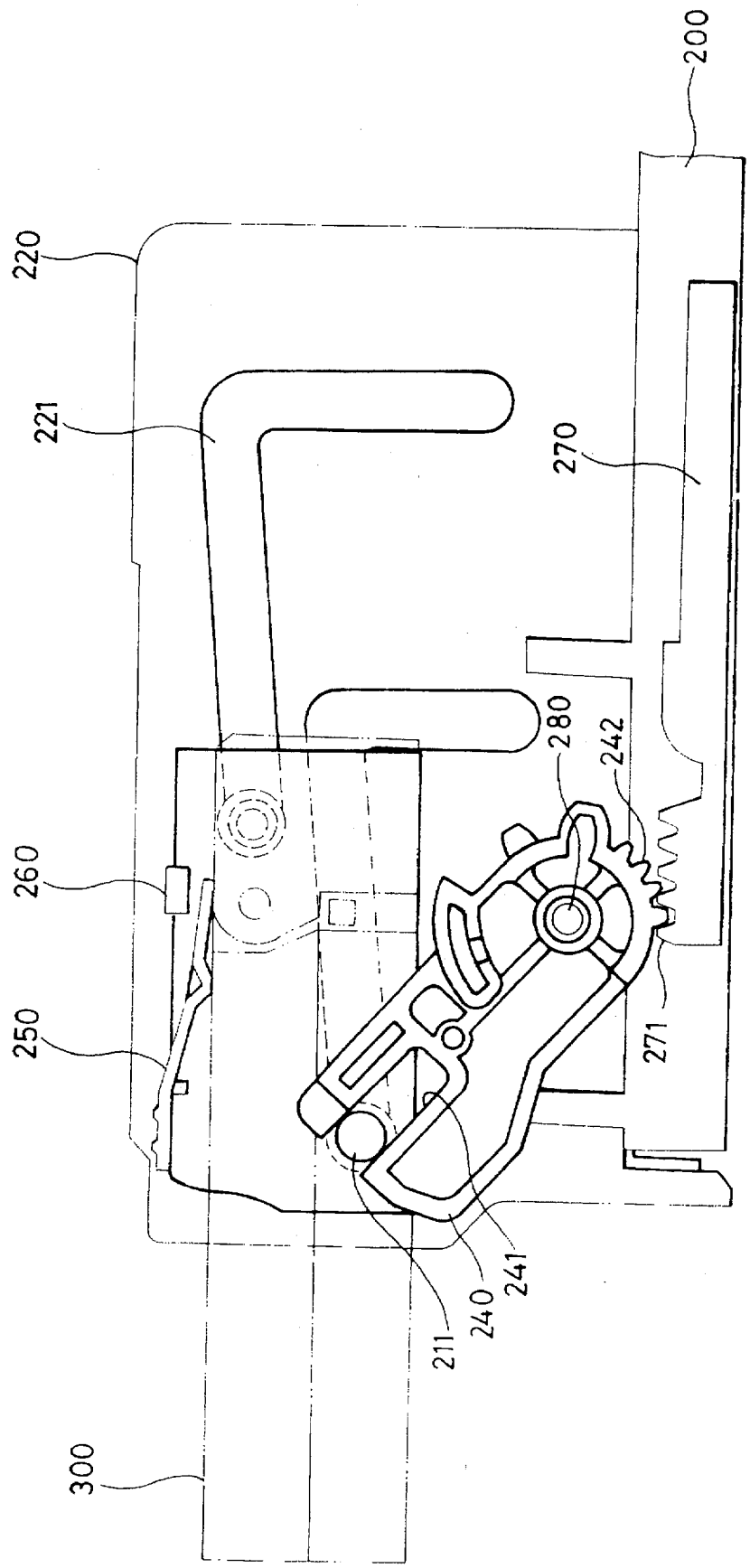
FIGS. 5 through 7 are views showing the operation of a loading apparatus according to the present invention.

Referring to FIG. 5, the moving unit for moving the holder 210 has a movement member 270 installed on the deck member 200, formed with a rack gear portion 271, and slidable with respect to the deck member 200 by a loading motor (not shown). The guide bracket 220 has a gear portion 242 which meshes with the rack gear portion 271 of the movement member 270, and is connected to a rotatable loading arm 240 having a guide groove 241 where the guide pin 211 is slidingly connected. The guide bracket 230 (FIG. 4) also has a rotatable loading arm (not shown) with a guide groove connected to the guide pin of the other side of the holder 210. The loading arm which is not shown does not have a gear portion. The pair of loading arms (240 and the one not shown) are connected to each other by a shaft 280. When the movement member 270 is moved by the driving of the loading motor, the loading arm 240 rotates and the holder 210 moves in the rotation direction of the loading arm 240.

Meanwhile, a biasing unit applies pressure to the top of the tape cassette 300 to stably place it in the holder 210 and presses the tape of the tape cassette 300 on the reel tables so that the tape can run smoothly. The biasing unit, as shown in FIG. 4, includes a leaf spring member 250 having one end fixed on one side wall of the holder 210 and a stop 260 installed in the holder 210 at a predetermined position on an elastic deformation path of the leaf spring member 250. The stop 260 can be integrally formed in the body of the holder 210 or made of a separate member. The stop 260 is positioned higher than the other end portion of the leaf spring member 250. The middle portion of the leaf spring member 250 has a bent portion 250' for making contact with the top of the tape cassette 300.

Figure 8:
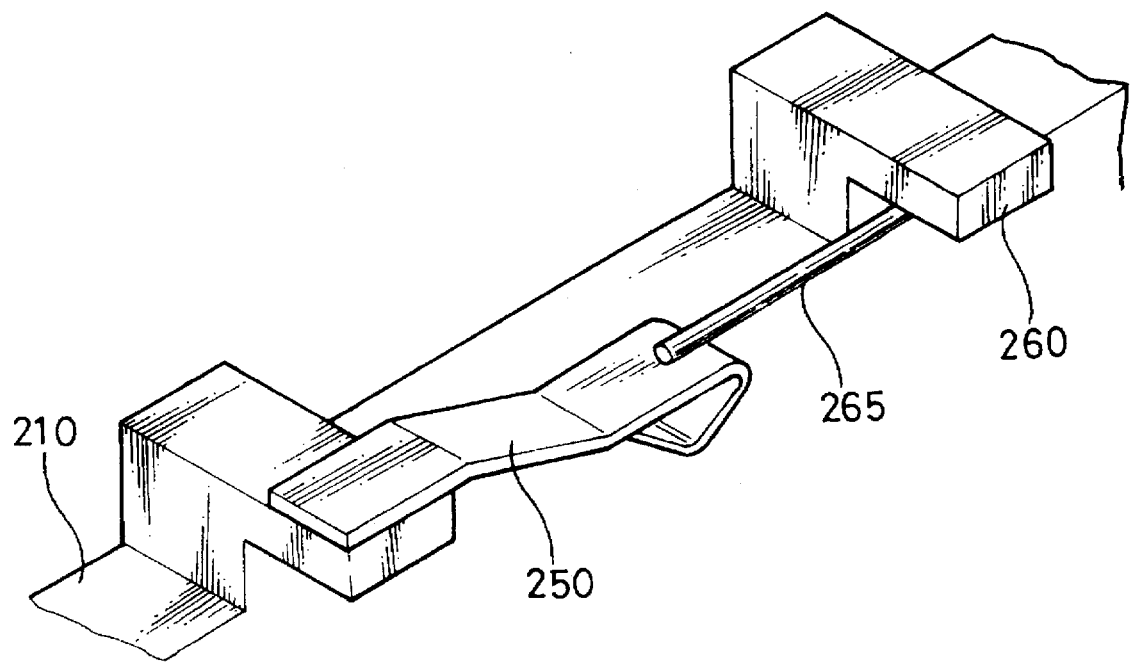
FIG. 8 is an extracted perspective view showing another embodiment of a loading apparatus according to the present invention.

Referring to FIG. 8, the biasing unit may have a structure in which the stop 260 is installed at a position deviating from the elastic deformation path of the leaf spring member 250, i.e., deviating from the end of the leaf spring member 250, and an auxiliary spring 265 is connected between the stop 260 and the leaf spring member 250. In this case, the tape cassette 300 is pressed by the elasticity of the leaf spring member 250 and the auxiliary spring 265.

During operation of the loading apparatus according to the present invention, when the tape cassette 300 is inserted into the holder 210 as shown in FIG. 5, the tape cassette 300 is pressed by the leaf spring member 250 for stable reception into the holder 210. At this stage, the end of the leaf spring member 250 is not in contact with the stop 260.

Figure 6:
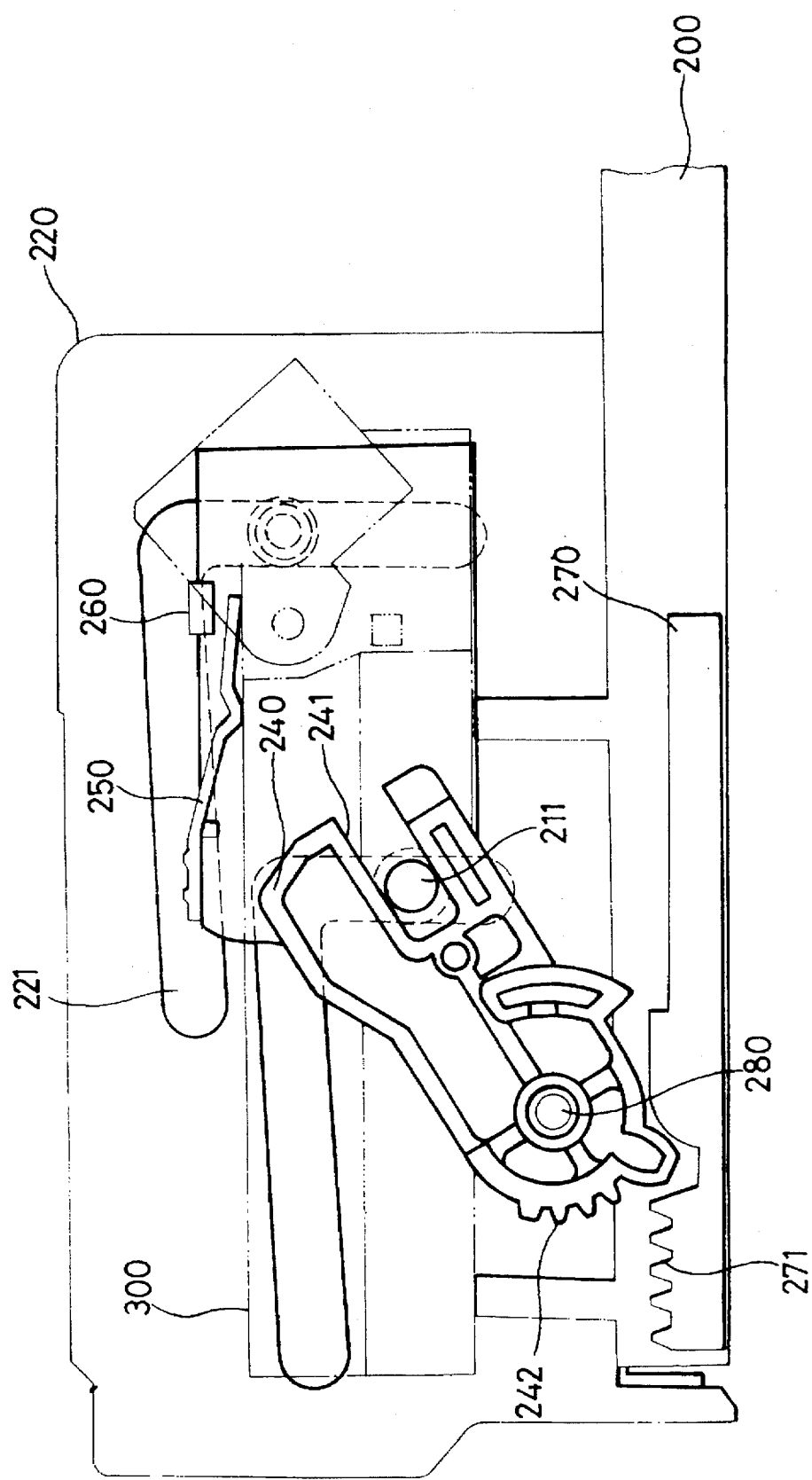

Referring to FIG. 6, when the loading motor drives the movement member 270, the loading arm 240 interlocks with the movement of the movement member 270 and rotates clockwise. Thus, the holder 210 is loaded while being guided along the guide slots 221 and 222 by the rotation of the loading arm 240.

Figure 7:
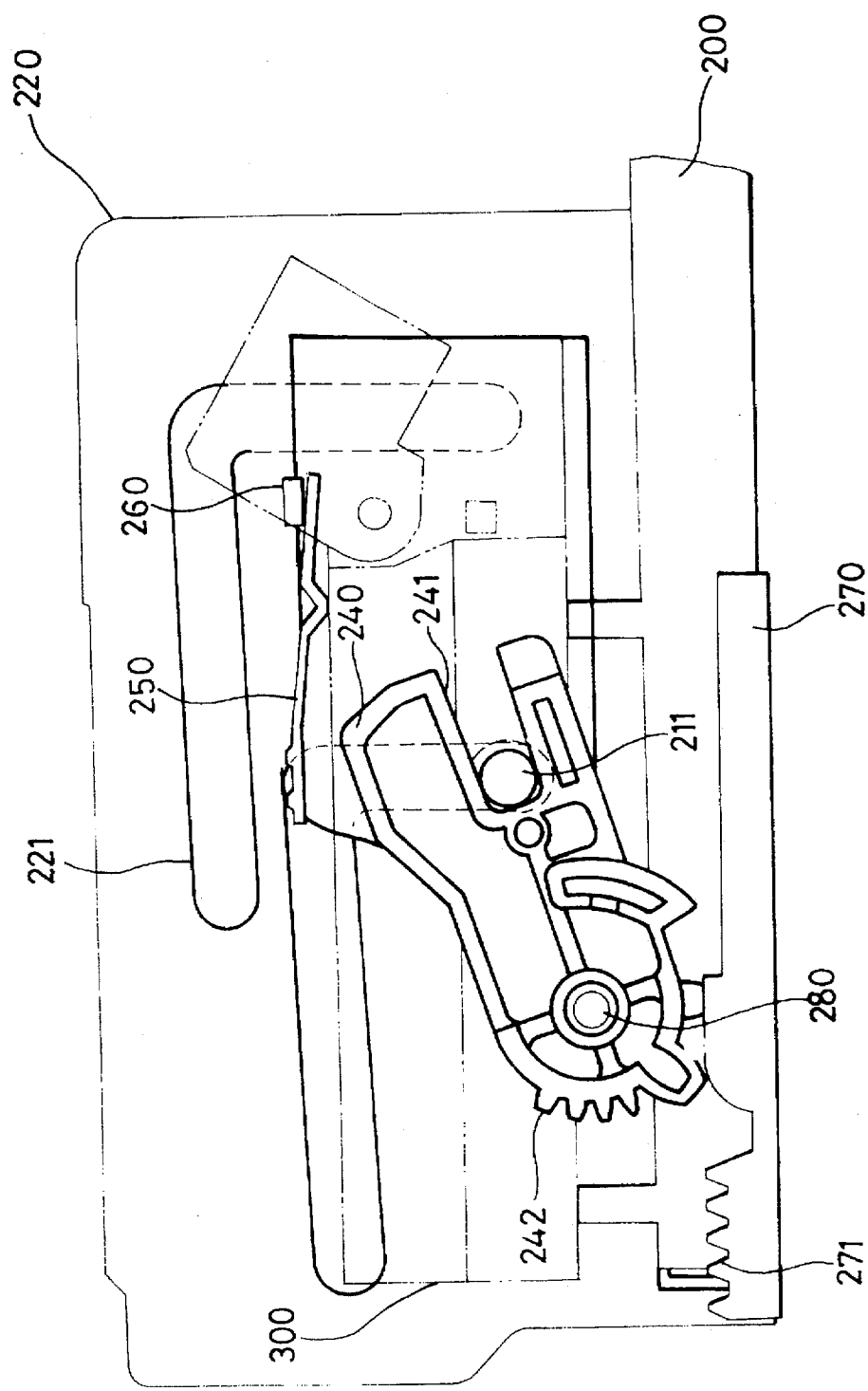

Referring to FIG. 7, in the final step of loading where the tape cassette 300 is stably placed on the reel tables, the holder 210 descends a little further by the driving of the loading motor. While the end portion of the leaf spring member 250 is supported by the stop 260, the bent portion 250' presses against the upper surface of the tape cassette 300. The elastic biasing power of the leaf spring member 250 is stronger now than during initial insertion. Accordingly, the tape cassette 300 is placed stably onto the reel tables thereby allowing the tape coming from the tape cassette 300 to run smoothly.

The above-described tape cassette loading apparatus according to the present invention and having a single leaf spring member 250 positions a tape cassette stably during initial insertion and also stably places the tape cassette onto the reel tables. Accordingly, there is no need for a torsion spring for stably placing the tape cassette onto the reel tables, unlike the previously proposed apparatus, thereby reducing the number of components. Further, the absence of a torsion spring reduces noise generated during the ejecting operation.

It is contemplated that numerous modifications may be made to the tape cassette loading apparatus of the present invention without departing from the spirit and scope of the invention as defined in the following claims.

What is claimed is:

1. A tape cassette loading apparatus of a tape recorder, comprising:

a deck member having reel tables on which a tape cassette is seated;

a holder movably mounted with respect to said deck member and for receiving the tape cassette, said holder having a bottom wall and a pair of side walls substantially perpendicular thereto;

means for guiding said holder from an initial position of the tape cassette to a seated position where the tape cassette is seated on said reel tables;

a movement unit for moving said holder; and means for elastically biasing the tape cassette toward said reel tables when the tape cassette is at the seated position, wherein said biasing means includes a leaf spring member with one end fixed on one of said side walls of said holder, and a stop installed on the one of said side walls of said holder at a predetermined position on an elastic deformation path of said leaf spring member so that when the tape cassette is seated on said reel tables, a part of said leaf spring member presses an upper surface of the tape cassette while another end of said leaf spring member is supported by said stop.

2. The tape cassette loading apparatus of a tape recorder according to claim 1, wherein said biasing means further comprises an auxiliary spring connected between said stop and said leaf spring member.

3. The tape cassette loading apparatus of a tape recorder according to claim 2, wherein a bent portion is formed in a middle portion of said leaf spring member to press against the upper surface of the tape cassette.

4. The tape cassette loading apparatus of a tape recorder according to claim 1, wherein said guiding means comprises guide brackets formed at both sides of said deck member and having a plurality of guide slots, and guide pins formed at both sides of said holder and slidingly connected to said guide slots.

5. The tape cassette loading apparatus of a tape recorder according to claim 4, wherein said movement unit comprises:

a movement member having a rack gear formed on one side thereof, being slidingly installed with respect to said deck member and being moved by a motor; and a loading arm rotatably installed on said guide bracket, having a gear portion meshed with said rack gear of said movement member, and formed with a guide groove slidingly connected to one of said guide pins of said holder.

6. The tape cassette loading apparatus of a tape recorder according to claim 1, wherein a bent portion is formed in a middle portion of said leaf spring member to press against the upper surface of the tape cassette.

7. A tape cassette loading apparatus of a tape recorder, comprising:

a deck member having reel tables on which a tape cassette is seated;

a holder movably mounted with respect to said deck member and for receiving the tape cassette;

means for guiding said holder from an initial position of the tape cassette to a seated position where the tape cassette is seated on said reel tables;

a movement unit for moving said holder; and means for elastically biasing the tape cassette toward said reel tables when the tape cassette is at the seated position, wherein said biasing means includes a leaf spring member with one end fixed at one side of said holder, and a stop installed on said holder at a predetermined position on an elastic deformation path of said leaf spring member so that when the tape cassette is seated on said reel tables, a part of said leaf spring member presses an upper surface of the tape cassette while another end of said leaf spring member is supported by said stop, and wherein said biasing means further comprises an auxiliary spring connected between said stop and said leaf spring member.

8. The tape cassette loading apparatus of a tape recorder according to claim 7, wherein a bent portion is formed in a middle portion of said leaf spring member to press against the upper surface of the tape cassette.

* * * * *